(12) United States Patent
Yamashita et al.

(10) Patent No.: US 6,565,156 B1
(45) Date of Patent: May 20, 2003

(54) ANGLE ADJUSTING DEVICE

(75) Inventors: Yoshinobu Yamashita, Sakai (JP); Tadanobu Yamashita, Sakai (JP)

(73) Assignee: Koyo Giken Co., Ltd., Sakai (JP)

( * ) Notice: Subject to any disclaimer, the term of this patent is extended or adjusted under 35 U.S.C. 154(b) by 0 days.

(21) Appl. No.: 09/889,233

(22) PCT Filed: Feb. 3, 2000

(86) PCT No.: PCT/JP00/00603

§ 371 (c)(1), (2), (4) Date: Jul. 13, 2001

(87) PCT Pub. No.: WO00/46519

PCT Pub. Date: Aug. 10, 2000

(30) Foreign Application Priority Data

Feb. 3, 1999 (JP) ............................................. 11-026705

(51) Int. Cl.[7] ................................................. B60N 2/24

(52) U.S. Cl. ................... 297/354.12; 297/366; 297/364; 297/374; 403/97

(58) Field of Search .......................... 297/354.12, 373, 297/364, 369, 376, 374; 403/87, 92, 93, 97, 98

(56) References Cited

U.S. PATENT DOCUMENTS

| | | | | |
|---|---|---|---|---|
| 3,972,563 A | * | 8/1976 | Gustafsson | ................... 16/250 |
| 4,609,314 A | | 9/1986 | Metz | |
| 5,516,198 A | * | 5/1996 | Yokoyama | ................... 297/362 |
| 5,520,474 A | * | 5/1996 | Liu | ............................. 403/103 |

FOREIGN PATENT DOCUMENTS

| | | |
|---|---|---|
| JP | 1-135516 | 9/1989 |
| JP | 2-134316 | 11/1990 |
| JP | 03-045206 | 2/1991 |

\* cited by examiner

Primary Examiner—Milton Nelson, Jr.
Assistant Examiner—Erika Garrett
(74) Attorney, Agent, or Firm—Burns, Doane, Swecker & Mathis, LLP

(57) ABSTRACT

A ratchet gear is provided to each of a pair of arms (rotors), which are coupled through a bolt, at counter surfaces of a pair of their respective rotary portions opposing in an axial direction of the bolt serving as an axis of relative rotation, and each ratchet gear is provided with a plurality of gear teeth, while both the arms are pushed in their opposing direction by a spring, so that a relative rotating position of the arms is adjusted step by step per an angle set in accordance with the gear teeth, whereby it is possible to provide a rigid angle adjusting device that can be assembled at a low cost without increasing the size.

17 Claims, 12 Drawing Sheets

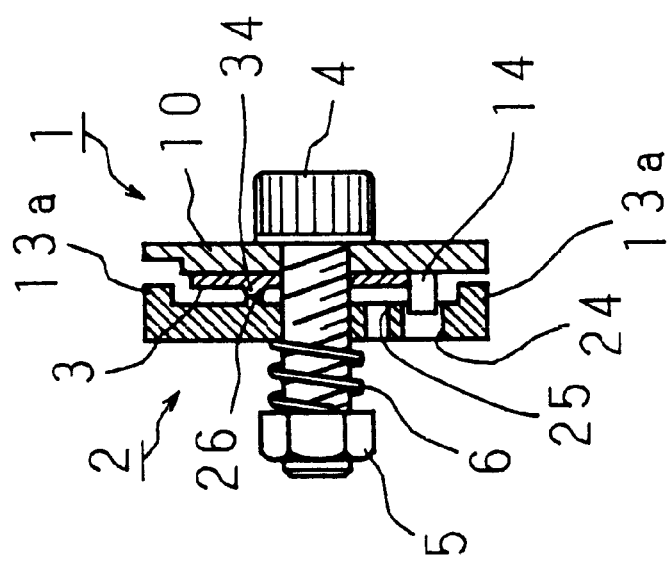
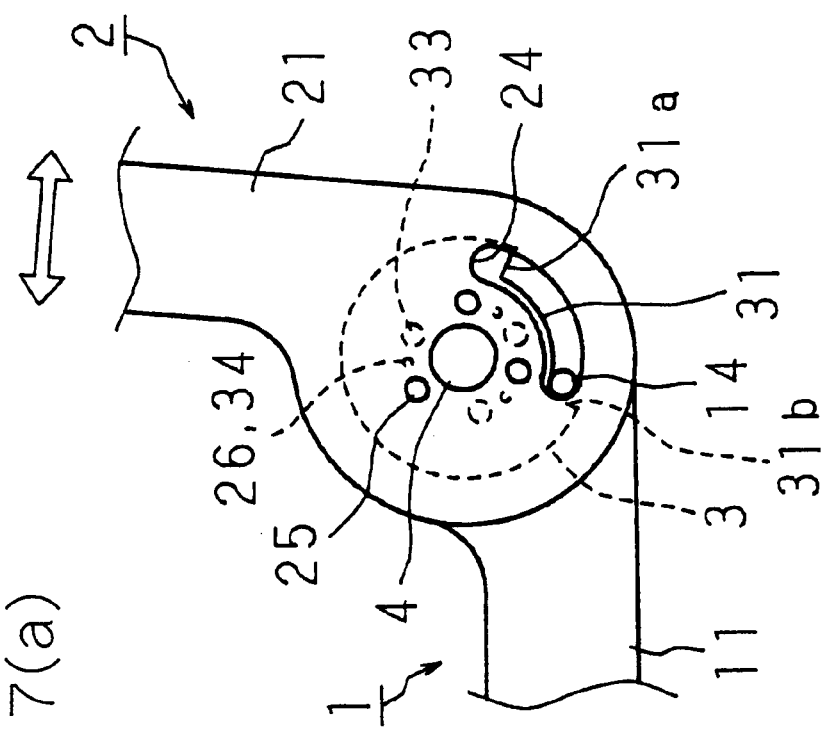
FIG. 7(a)
FIG. 7(b)

ANGLE ADJUSTING DEVICE

TECHNICAL FIELD

The present invention relates to an angle adjusting device for adjusting a tilting angle of a backrest portion of a legless chair or a foldable bed, for example.

BACKGROUND ART

In an easy-to-carry foldable bed folded into three by folding down the backrest portion and footrest portion over the seat portion, for example, each of the frames respectively forming the backrest portion and footrest portion is coupled to the frame of the seat portion through an angle adjusting device, whereby it is possible to adjust tilting angles of the backrest portion and footrest portion with respect to the seat portion.

As is disclosed in Japanese Utility Model Publication No. 59-20118 filed by the inventors of the present application, for example, such an angle adjusting device is provided with coupling portions each coupled to the respective tip end portions of the two frames respectively forming, for example, the seat portion and backrest portion.

The coupling portion at the seat portion side commonly used as the stationary side is provided with a pair of disc portions with their thickness direction directed to the width direction of the foldable bed, and the coupling portion at the backrest portion side commonly used as the movable side coaxially supports a spur ratchet gear placed with its thickness direction directed to the width direction of the foldable bed.

Also, a hook of ratchet supported somewhere between the pair of disc portions is allowed to move around the axis in the width direction of the foldable bed, and pushed by a spring in a direction such that the ratchet engages with the gear teeth of a ratchet gear.

Each of the gear teeth has a tapered surface such that presses the ratchet against the spring in association with a rotation of the ratchet gear when the backrest portion is folded, so that the engagement with the ratchet can be released. However, once the ratchet reaches the adjacent gear tooth, the ratchet constantly pushed by the spring engages with that gear tooth again. Also, each of the gear teeth has a surface of a shape such that maintains the engagement with the ratchet in association with a rotation of the ratchet gear when the backrest portion is unfolded.

Hence, a tilting angle of the backrest portion can be changed as one desires in the folding direction, whereas the tilting angle of the backrest portion in the unfolding direction with respect to the seat portion can be changed step by step in accordance with the gear teeth because the ratchet is locked.

Here, the angle adjusting device as discussed above is provided with releasing mechanism that releases the engagement between the ratchet and gear teeth by pressing the ratchet against the spring when a tilting angle of the backrest portion in the folding direction reaches a predetermined angle. The releasing mechanism returns the ratchet and gear teeth in the initial engagement state when the backrest portion is rotated to the maximum unfolded position after the engagement is released.

However, the conventional angle adjusting device as discussed above maintains the backrest portion, for example, of the foldable bed, at a predetermined angle by engaging the ratchet with a single gear tooth of the ratchet gear, which raises a problem that, when one lies down on the foldable bed, all the applied load concentrates onto the single gear tooth and ratchet.

The above problem may be solved by upsizing the gear teeth and ratchet. However, this solution causes inconveniences such that the entire angle adjusting device becomes so large that it impairs one's lying comfort, etc. Also, when the gear teeth alone are upsized while maintaining the size of the entire angle adjusting device intact, the total number of the teeth is reduced, which raises another problem that an adjustable angle per step becomes larger.

It may be possible to increase hardness of the gear teeth and ratchet without changing their respective sizes by subjecting the same to carburization or making the same out of materials having higher hardness. However, this increases the manufacturing costs, which poses another problem.

The present invention is devised to solve the above problems and has an object to provide a rigid angle adjusting r, which can be assembled at a low cost without increasing the size by providing a plurality of engaging portions to a pair of rotors that relatively rotate around the axis of rotation on their respective counter surfaces opposing in a direction along the axis of rotation, and pushing the rotors in an opposing direction by a spring so as to maintain the engagement of the engaging portions on the rotors.

SUMMARY OF THE INVENTION

An angle adjusting device of the present invention is an angle adjusting device capable of adjusting a relative rotating position of a pair of rotors coupled through an axis of rotation step by step, the device including: a plurality of engaging portions provided on surfaces of the pair of rotors opposing in a direction along the axis of rotation; and a spring for pushing the pair of rotors in an opposing direction.

According to the invention, it is arranged such that a plurality of engaging portions are provided to a pair of rotors that relatively rotate around the axis of rotation on their respective counter surfaces opposing in a direction along the axis of rotation, and a spring for pushing the rotors in an opposing direction is provided to maintain the engagement between the rotors. Consequently, it is possible to readily assemble a rigid and compact angle adjusting device that develops a quite large engaging strength by engaging at the plurality of engaging portions.

The angle adjusting device of the present invention can be attached to a foldable bed, a legless chair, etc. as discussed above through coupling portions that will be described below. It should be appreciated, however, that the application is not limited to the foldable bed, legless chair, etc., and the angle adjusting device can be employed in other products that need angle adjustment. Also, the angle adjusting device does not have to be attached to the foldable bed, legless chair, etc. through the coupling portion, and can be attached to the same at the rotors either directly or indirectly.

Another angle adjusting device of the present invention is characterized by further including a releasing body placed concentrically somewhere between the pair of rotors, wherein the releasing body allows engagement between the pair of rotors when placed at a first rotating position with respect to either one of the pair of rotors, and releases the engagement by moving the pair of rotors apart from each other when placed at a second rotating position.

According to the invention, it is arranged such that a releasing body is placed concentrically somewhere between the pair of rotors, and the releasing body allows engagement between the pair of rotors when placed at the first rotating position with respect to either one of the pair of rotors, and releases the engagement by moving the pair of rotors apart from each other when placed at the second rotating position. Consequently, it is possible to provide releasing mechanism for the engagement of the angle adjusting device as discussed above by a simple arrangement.

Still another angle adjusting device of the present invention is characterized in that: one of the either one of the rotors and the releasing body is provided with a convex portion on a counter surface opposing the other; and the other is provided with, on a counter surface opposing a counterpart, a concave portion that engages with the convex portion when the releasing body is placed at the first rotating position, the convex portion moving one of the either one of the rotors and the releasing body apart from the other by touching the counter surface of the other except for the concave portion when the releasing body is placed at the second rotating position.

According to the invention, it is arranged such that one of the either one of the rotors and the releasing body is provided with a convex portion on a counter surface opposing the other, and the other is provided with, on a counter surface opposing a counterpart, a concave portion that engages with the convex portion when the releasing body is placed at the first rotating position, the convex portion moving one of the either one of the rotors and the releasing body apart from the other by touching the counter surface of the other except for the concave portion when the releasing body is placed at the second rotating position. Consequently, when the releasing body is at the first rotating position, the convex portion fits into the concave portion and the releasing body is in a state described as, for example, closely adhering to the either one of the rotors, whereby the pair of rotors engage with each other. On the other hand, when the releasing body is at the second rotating position, the convex portion touches the counter surface of the other except for the concave portion, whereby the either one of the rotors and the releasing body that have been in the above closely adhering state are moved apart relatively from each other. Consequently, the either one of the rotors and the other rotor are spaced apart from each other, thereby making it possible to release the engagement as discussed above.

Still another angle adjusting device of the present invention is characterized in that the releasing body is provided with two contact portions spaced apart by a predetermined distance in a direction of a relative rotation with respect to the other rotor, and the other rotor is provided with a moving portion that moves between the two contact portions in association with a relative rotation with respect to the releasing body, the moving portion allowing the releasing body to rotate to the first and second rotating positions with respect to the either one of the rotors by touching the two contact portions, respectively.

According to the invention, it is arranged such that the releasing body is provided with two contact portions spaced apart by a predetermined distance in a direction of a relative rotation with respect to the other rotor, and the other rotor is provided with a moving portion that moves between the two contact portions in association with a relative rotation with respect to the releasing body, the moving portion allowing the releasing body to rotate to the first and second rotating positions with respect to the either one of the rotors by touching the two contact portions, respectively. Consequently, it is possible to readily achieve rotating mechanism of the releasing body as discussed above.

Still another angle adjusting device of the present invention is characterized in that the axis of rotation is composed of a rivet.

According to the invention, it is arranged such that the axis of rotation that couples the pair of rotors is composed of a rivet. Consequently, the dimension of the entire angle adjusting device in a direction along the axis of rotation can be made compact.

Still another angle adjusting device of the present invention is characterized in that the spring is a spiral spring.

According to the invention, it is arranged such that the spring is a spiral spring. Consequently, the dimension of the entire angle adjusting device in the direction along the axis of rotation can be made more compact. Here, a conical spring made of a wire material, a volute spring made out of a plate material, etc. can be used as the spiral spring.

Still another angle adjusting device of the present invention is characterized in that each of the engaging portions is shaped into a triangle including the counter surface of either rotor where each is provided when seen on a cross section in a radius direction of a rotation of the rotor, and either one of side portions of the triangle other than a side on the counter surface of either rotor engages with a corresponding side portion of the engaging portion on the other rotor.

According to the invention, it is arranged such that each of the engaging portions is shaped into a triangle including the counter surface of either rotor where each is provided when seen on a cross section in a radius direction of a rotation of the rotor, and either one of side portions of the triangle other than a side on the counter surface of either rotor engages with a corresponding side portion of the engaging portion on the other opposing rotor. Consequently, it is possible to shape each engaging portion into a quite simple triangle tooth.

Still another angle, adjusting device of the present invention is characterized in that the either one of side portions is titled by a predetermined angle toward an engaging direction from the opposing direction.

According to the invention, the either one of side portions is shaped into a serration by giving a tilt of a predetermined angle toward an engaging direction from the opposing direction. Hence, when a force is applied in a direction of a relative rotation of the rotors to maintain their engagement, in order to release the engagement by moving the rotors apart from each other, it is necessary to separate the rotors from each other by forcing each rotor to rotate relatively in a direction against the above force. Consequently, it is possible to maintain the engagement so as not to be released accidentally.

Still another angle adjusting device of the present invention is characterized in that each of the engaging portions is formed by cutting and bending a part of either rotor where each is provided.

According to the invention, it is arranged such that each of the engaging portions is formed by cutting and bending a part of the rotor. Consequently, it is possible to readily form the engaging portions as an integral part of the rotor commonly formed out of a metal plate.

Still another angle adjusting device of the present invention is characterized in that the plurality of engaging portions are aligned in more than one line at different positions in a diameter direction of each rotor where the plurality of engaging portions are provided.

According to the invention, it is arranged such that the engaging portions are aligned in more than one line at different positions in a diameter direction of the rotor. Consequently, because a larger number of engaging portions can be provided, the adjustment can be carried out step by step with a smaller angle.

Still another angle adjusting device of the present invention is characterized in that different intervals are given to the plurality of engaging portions in a direction of a rotation between the pair of rotors opposing each other.

According to the invention, it is arranged such that different intervals are given to the engaging portions in a circumferential direction of a rotation between the pair of rotors. Consequently, even when fewer engaging portions are provided, it is possible to carry out the adjustment in every angle set according to the greatest common divisor of isometric angles of the engaging portions on each rotor.

Still another angle adjusting device of the present invention is characterized in that at least one of the pair of rotors is provided with a coupling portion for coupling to a bar-wise or tube-wise member.

According to the invention, it is arranged such that at least one of the pair of rotors is provided with a coupling portion for coupling to a bar-wise or tube-wise member. Consequently, the coupling portion can be readily coupled to the frames of a legless chair, a foldable bed, for example.

Still another angle adjusting device of the present invention is characterized in that the coupling portion is cylindrical.

According to the invention, because it is arranged such that the coupling portion is cylindrical, the coupling portion can be coupled to the frames more readily by fitting the former into the latter.

Still another angle adjusting device of the present invention is characterized in that at least one of the pair of rotors is formed as an integral part of the coupling portion.

According to the invention, it is arranged such that at least one of the pair of rotors is formed as an integral part of the coupling portion. Consequently, the angle adjusting device can be assembled at a low cost by making these components out of a plate of metal, for example.

Still another angle adjusting device of the present invention is characterized in that at least one of the pair of rotors and the plurality of engaging portions are formed out of synthetic resin as one body.

According to the invention, because it is arranged such that the rotor and engaging portions are formed out of synthetic resin as one body, the angle adjusting device can be assembled at a lower cost.

Still another angle adjusting device of the present invention is characterized in that at least one of the pair of rotors is provided with a cover that covers, either partially or entirely, the plurality of engaging portions from an outside in a radius direction of a rotation.

According to the invention, it is arranged such that at least one of the pair of rotors is provided with a cover that covers the engaging portions from an outside in a radius direction of a rotation. Consequently, it is possible to prevent unwanted intrusion of dust into the engaging surfaces of the engaging portions or the like from the outside.

A further angle adjusting device of the present invention is characterized in that at least one of the pair of rotors and the cover are formed as one body.

According to the invention, it is arranged such that the aforementioned cover and at least one of the pair of rotors are formed as one body. Consequently, it is possible to assemble an angle adjusting device equipped with such a cover at a lower cost.

BRIEF DESCRIPTION OF THE ACCOMPANYING DRAWINGS

FIG. 7 are explanatory views explaining an operation of the angle adjusting device according to the present invention;

BEST MODE FOR CARRYING OUT THE INVENTION

The following description will describe in detail the present invention with reference to accompanying drawings in which embodiments of the invention are illustrated.

First Embodiment

Figure 1:
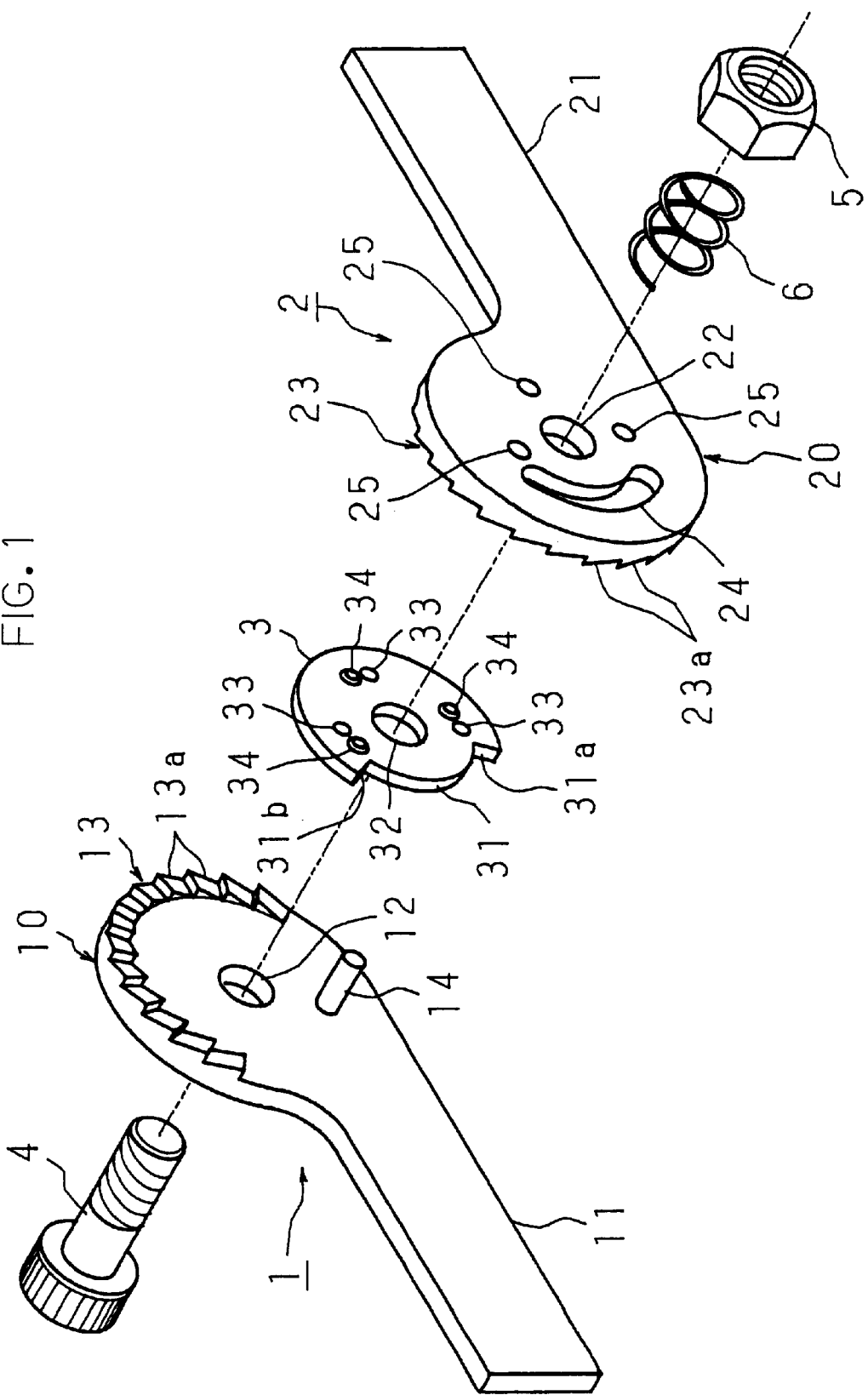
FIG. 1 is an exploded perspective view showing an arrangement of a first embodiment of an angle adjusting device according to the present invention.

FIG. 1 is an exploded perspective view showing an arrangement of a first embodiment of an angle adjusting device according to the present invention. The angle adjusting device of the present embodiment includes a pair of arms 1 and 2, a releasing body 3, a bolt 4, a nut 5, and a spring 6 composed of a coil spring, and for use, the arms 1 and 2 are respectively joined to where they should be coupled to, for example, a pair of frames in a foldable bed.

Each of the arms 1 and 2 is formed out of a plate of metal into an almost P shape when seen in one plane. In each P shape, the top (larger) portion forms a rotary portion 10/20 as a disc of rotor, and the bottom (smaller) portion forms a strip of coupling portion 11/21.

For ease of explanation, in FIG. 1, each of the arms 1 and 2 is placed with the rotary portion 10/20 that protrudes toward the lateral side of the P shape (the width direction of the coupling portion 11/21) facing upward and the coupling portion 11/21 at a horizontal position.

Also, of the two arms, the arm 1 is placed with the top end of its coupling portion 11 facing to the left side, and the other arm 2 is placed in front of the arm 1 with the top end of its coupling portion 21 facing to the right side, which state being defined as the initial state.

A through hole 12 for the bolt 4 serving as the axis of rotation is made through at the center of the rotary portion 10 of the arm 1. Also, a ratchet gear 13 is formed along a part of the peripheral portion of the front side surface of the rotary portion 10 in the circumferential direction as a plurality of engaging portions.

Each gear tooth 13a is shaped into a spike with its trough portion directed to the radius direction of the rotary portion 10. Also, a control pin 14 as a moving portion is provided at the inner radial position of the ratchet gear 13 in such a manner so as to protrude frontward.

Figure 2A:
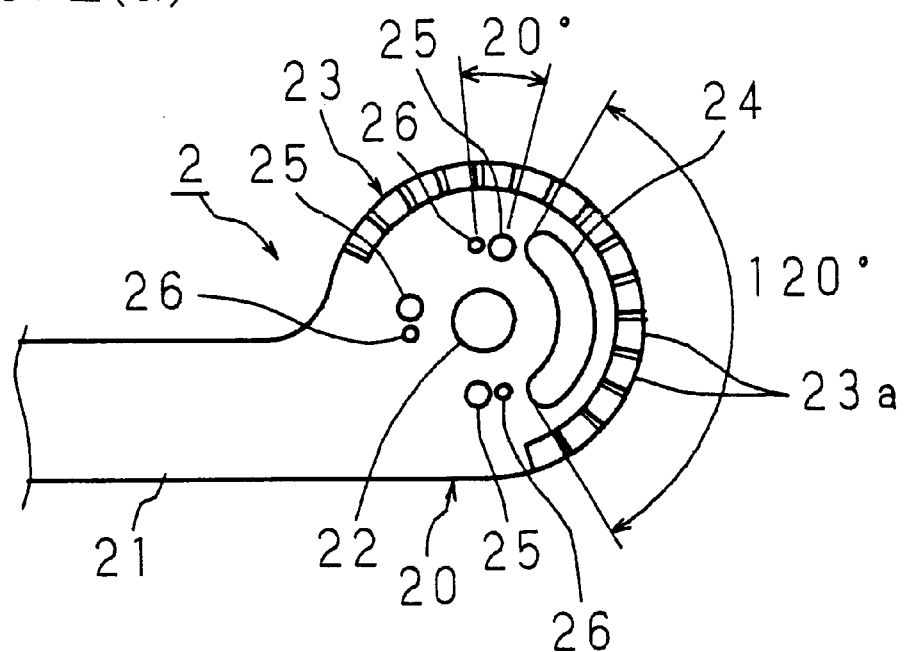
FIG. 2 are plan views respectively showing an arrangement of one of two arms and an arrangement of a releasing body of the angle adjusting device shown in FIG. 1.

FIG. 2 are plan views respectively showing the arrangement of the arm 2 as one of the arms and the arrangement of the releasing body 3 of the angle adjusting device shown in FIG. 1, and each shows a state when seen from the inward (from the bolt 4 side). As is shown in FIG. 2(a), the rotary portion 20 of the arm 2 is provided with a through hole 22 and a ratchet gear 23 in the same manner as the arm 1. Also, a slit 24 of approximately 120° long in the circumferential direction is provided to the inner side surface of the rotary portion 20 at a position corresponding to the control pin 14 provided on the arm 1. Further, three pit holes 25's adequately spaced apart in the circumferential direction are made through the rotary portion 20 as concave portions, and releasing pin 26 as a convex portion is provided to each pit hole 25 at the same angular, position (approximately 20°) in the counterclockwise direction in FIGS. 2.

Figure 2B:
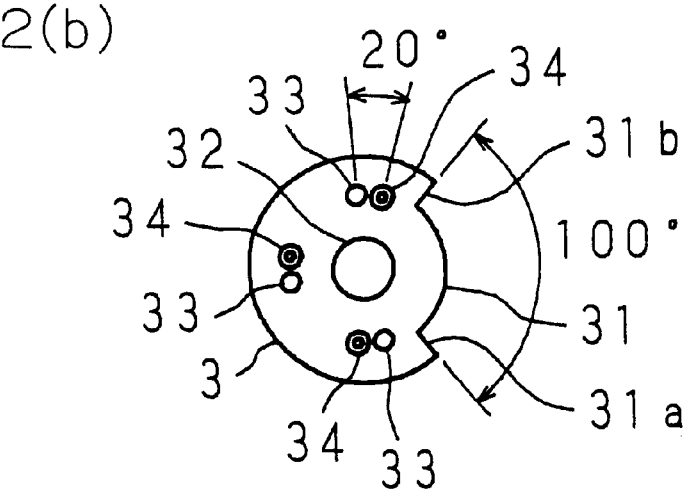

Also, as is shown in FIG. 2(b), the releasing body 3 is substantially a disc, and provided with a cutout portion 31 by cutting out the peripheral portion for approximately 100° long in the circumferential direction. Also, a through hole 32 for the bolt 4 is made through at the center portion of the releasing body 3. Further, the releasing body 3 is provided with three pit holes 33's at positions respectively corresponding to the three releasing pins 26's provided on the arm 2 as recess into which the releasing pins 26 respectively fit, and three releasing pins 34's at positions respectively corresponding to the three pit holes 25's on the arm 2 side as convex portions.

The device has components each arranged in the above manner, and is assembled by inserting the bolt 4 through the releasing body 3, arm 2, and spring 6 sequentially from the arm 1 side and tightening the nut 5 with an adequate force (see FIG. 4).

Figure 3A:
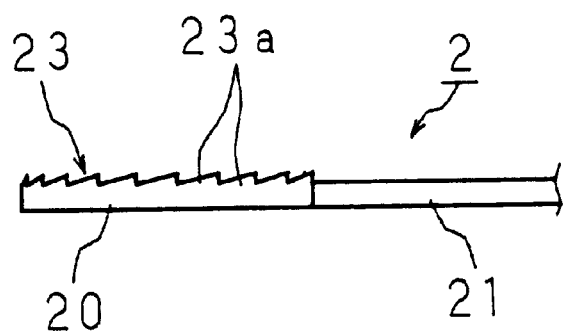
FIG. 3 are top views of the arms of the angle adjusting device shown in FIG. 1.
Figure 3B:
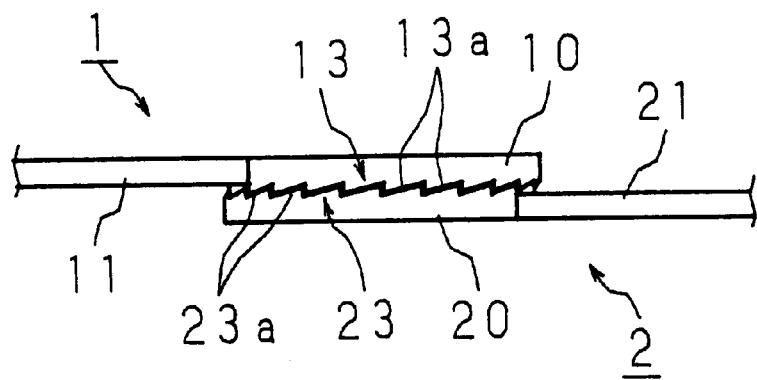

FIG. 3 are top views of the arms 1 and 2 of the angle adjusting device shown in FIG. 1. FIG. 3(a) shows the arm 2 alone, and FIG. 3(b) shows a state when the arms 1 and 2 are joined.

As is shown in FIG. 3(a), the ratchet gear 23 of the arm 2 has spikes of gear teeth 23a, each of which being shaped into a right triangle or nearly a right triangle when seen in the radius direction of the rotary portion 20, and all the gear teeth 23a's are directed to one direction so that the upright side of each gear tooth 23a at the upper circumference position is on the right side of FIG. 2 when seen from above.

Also, as is shown in FIG. 3(b), each gear tooth 13a on the arm 1 side is formed in the same manner as above when the arm 1 is placed in the same direction as the arm 2. Hence, as is shown in FIG. 3(b), the ratchet gears 13 and 23 mesh with each other exactly when the arms 1 and 2 are joined oppositely.

By subjecting each gear tooth 13a to hardening, it is possible to increase the hardness thereof as has been discussed above. For example, the hardness can be increased by approximately 30% by means of carburization.

FIGS. 4 through 7 are explanatory views explaining operations of the angle adjusting device according to the present invention. FIGS. 4(a), 5(a), 6(a), and 7(a) show the angle adjusting device seen from the front, and the nut 5 and spring 6 are omitted from these drawings for ease of understanding. Also, FIGS. 4(b), 5(b), 6(b), and 7(b) are longitudinal cross sections of FIGS. 4(a), 5(a), 6(a), and 7(a), respectively.

As is shown in FIG. 4, the control pin 14 is positioned in the vicinity of the bottom of the rotary portion 10 in the circumferential direction, and in the initial state, the control pin 14 touches the slit 24 of the rotary portion 20 at the end portion in the counterclockwise direction (in FIG. 4), as well as the cutout portion 31 of the releasing body 3 at an end portion 31a in the counterclockwise direction (in FIG. 4) as one of the contact portions.

Figure 4B:
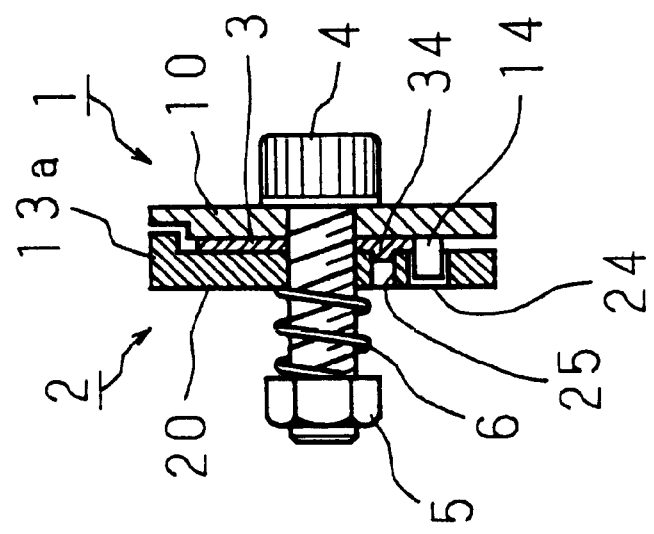
FIG. 4 are explanatory views explaining an operation of the angle adjusting device according to the present invention.
Figure 4A:
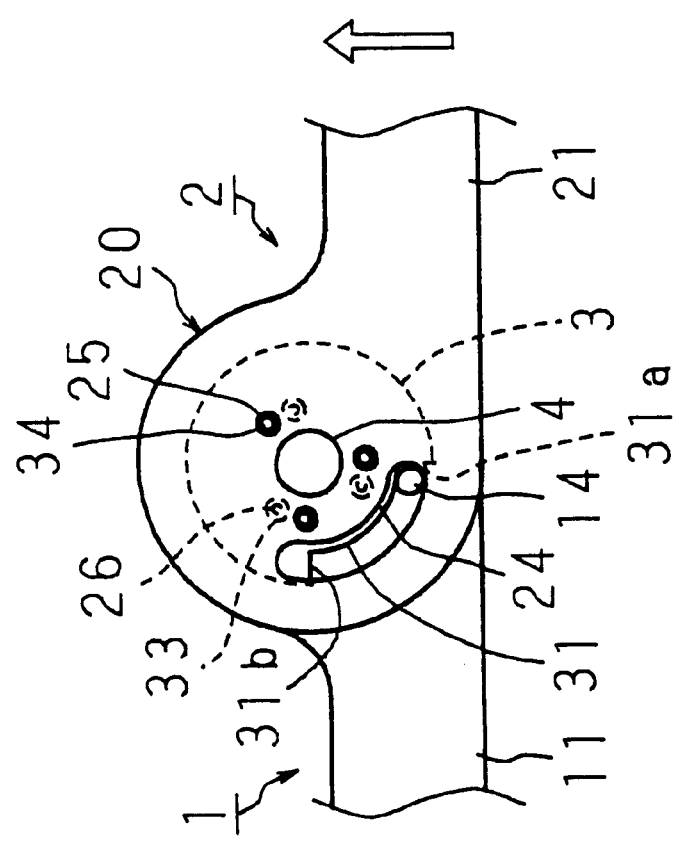
Figure 5B:
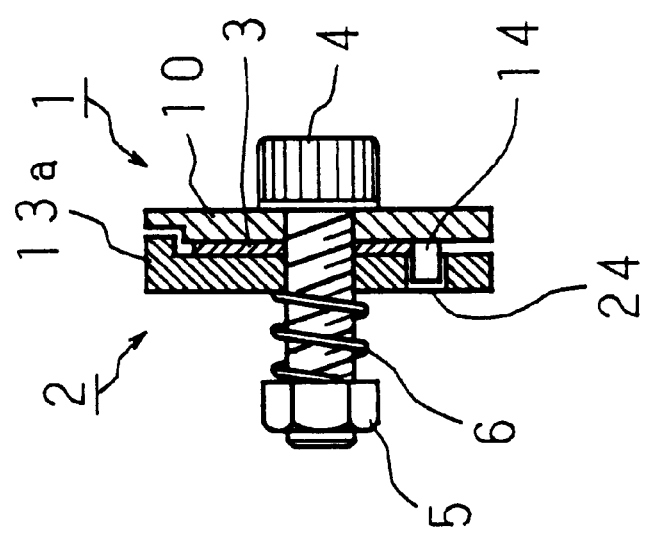
FIG. 5 are explanatory views explaining an operation of the angle adjusting device according to the present invention.
Figure 5A:
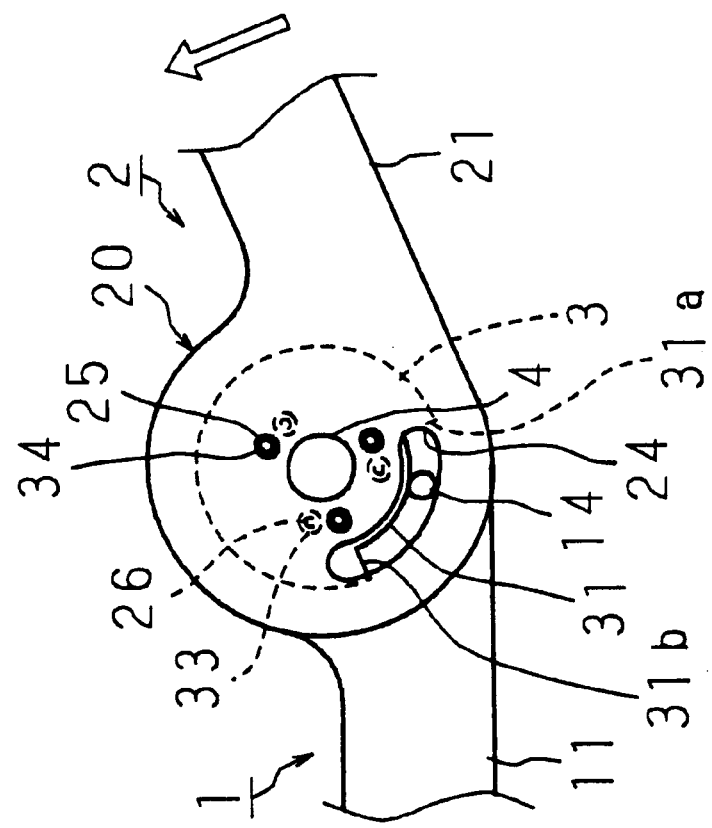
Figure 6B:
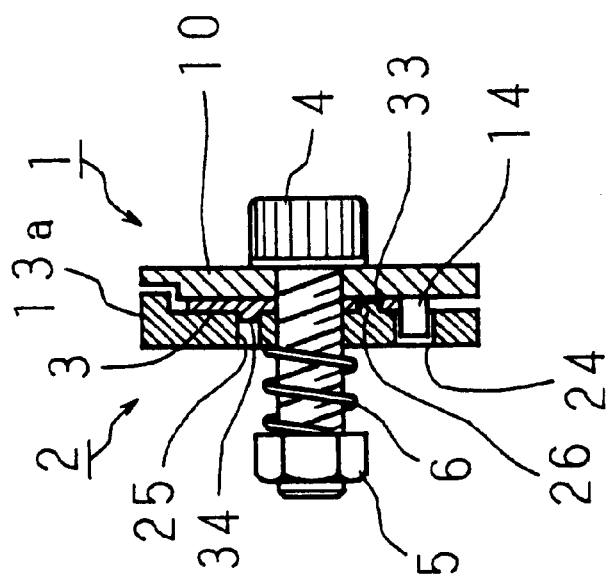
FIG. 6 are explanatory views explaining an operation of the angle adjusting device according to the present invention.
Figure 6A:
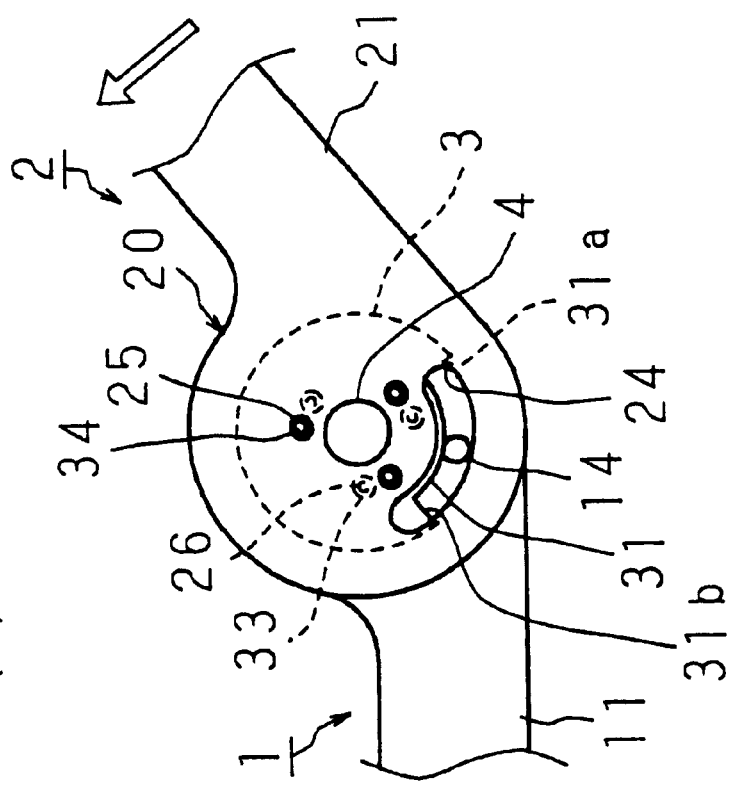

Also, as has been discussed above, each of the releasing pins 26's on the arm 2 side fits into their respective pit holes 33's on the releasing body 3 side, and each of the releasing pins 34's on the releasing body 3 fits into their respective pit holes 25's on the arm 2 side. Hence, under these conditions, as is shown in FIG. 4(b), the rotary portion 20 of the arm 2 pushed toward the arm 1 by the spring 6 adheres to the rotary portion 10 almost completely through the releasing body 3 with its ratchet gear 23 touching the ratchet gear 13 of the rotary portion 10.

Under the conditions shown in FIG. 4, the ratchet gear 13 on the arm 1 side and the ratchet gear 23 on the arm 2 side mesh and engage with each other, so that the arm 2 side is not allowed to rotate in a clockwise direction with respect to the arm 1 side serving as the stationary side by using the bolt 4 as the axis of rotation, for example.

On the other hand, as the arm 2 rotates in the counterclockwise direction, the ratchet gears 13 and 23 push the arm 2 against the pushing force of the spring 6 in a direction to be spaced apart from the arm 1 in such a manner that each mounts onto their respective engaging gear teeth 13a and 23a along the slopes thereof, whereby the engagement of the ratchet gears 13 and 23 is released.

As a result, the arm 2 starts to rotate in the counterclockwise direction, but is pushed by the spring 6 again when it reaches the adjacent gear teeth 13a and 23a, whereupon the arm 2 is placed in the state shown in FIG. 5.

In this manner, it is arranged such that the rotating position of the arm 2 with respect to the arm 1 can be adjusted per angle at which the gear teeth 13a and 23a are formed as are shown in FIG. 5 and FIG. 6, and the releasing body 3 engaged at the pit holes 25's and releasing pins 26's of the rotary portion 20 rotates in association with the rotary portion 20 of the rotating arm 2. Here, this relative rotating position of the releasing body 3 with respect to the rotary portion 20 is defined as a first rotating position.

Then, as is shown in FIG. 7, an end portion 31b of the cutout portion 31 of the releasing body 3 in the clockwise direction touches the control pin 14 on the arm 1 when the arm 2 has rotated by approximately 100° from the initial state shown in FIG. 5, whereupon the rotation of the releasing body 3 in this direction is locked. It should be appreciated, however, that the arm 2 is allowed to rotate further by approximately 20° until the control pin 14 on the arm 1 touches the end portion of the slit 24 in the clockwise direction.

This displacement of approximately 20° in the rotating positions between the arm 2 and releasing body 3, in other words, allowing the releasing body 3 to rotate with respect to the rotary portion 20 on the arm 2 side up to a second rotating position that is different from the first rotating position, permits the releasing pins 26's on the arm 2 to mount onto the releasing pins 34's on the releasing body 3, whereby the arm 2 is pushed against the spring 6 in a direction to be spaced apart from the arm 1, thereby releasing the engagement between the ratchet gears 13 and 23.

Strictly speaking, each of the releasing pins 34's on the releasing body 3 side is a spike with its top depressed rather than a pin, and the tip end of the corresponding releasing pin 26 on the arm 2 side fits into the depressed portion, thereby making it possible to maintain the released state of the engagement.

Further, under the released state, the releasing body 3 rotates in association with a rotation of the arm 2 in the clockwise direction, and the end portion 31a of the cutout portion 31 of the releasing body 3 in the counterclockwise direction touches the control pin 14 on the arm 1 when the releasing body 3 has rotated by approximately 100°, whereupon a further rotation of the releasing body 3 in this direction is locked. It should be appreciated, however, that the arm 2 is allowed to rotate further by approximately 20° until the control pin 14 on the arm 1 touches the end portion of the slip 24 in the counterclockwise direction.

This displacement of approximately 20° in the rotating positions between the arm 2 and releasing body 3 dismounts the releasing pins 26's on the arm 2 side that have mounted onto the releasing pins 34's on the releasing body 3 side, whereby the releasing pins 26's and 34's on each side fit into their respective pit holes 33's and 25's on the counter sides, thereby allowing the arm 2 and releasing body 3 to return to the initial state shown in FIG. 4.

The present embodiment showed the arrangement where the ratchet gears 13 and 23 are formed partially on the circumferences of the rotary portions 10 and 20, respectively. It should be appreciated, however, that the ratchet gears 13 and 23 may be formed on the entire circumferences, which ensures the strength of holding the rotating position of each of the arms 1 and 2.

Second Embodiment

Figure 8A:
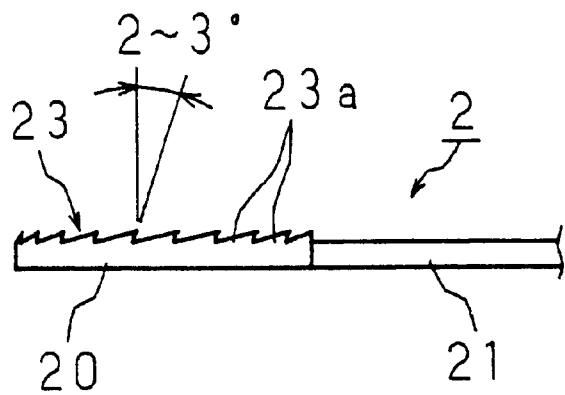
FIG. 8 are top views showing a second embodiment of the angle adjusting device according to the present invention.
Figure 8B:
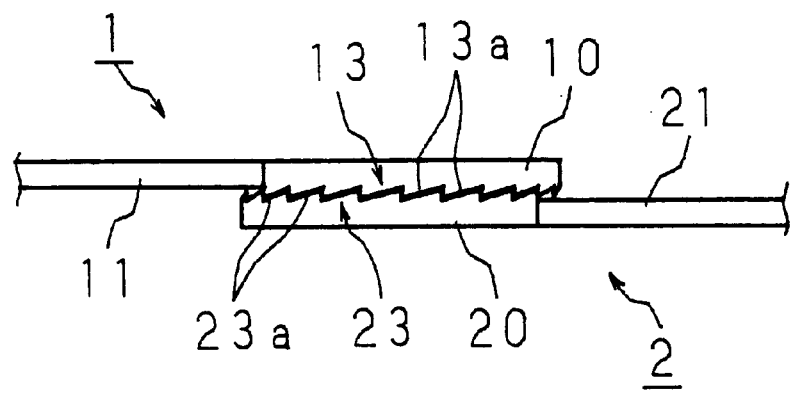

FIG. 8 are top views showing a second embodiment of the angle adjusting device according to the present invention, and show the top views of the arms 1 and 2. FIG. 8(a) shows the arm 2 alone and FIG. 8(b) shows a state when the arms 1 and 2 are joined. In the present embodiment, the gear teeth 13a and 23a respectively formed on the arms 1 and 2 are formed as serrations when seen in the radius direction of the rotary portions 10 and 20, and a tilt of a predetermined angle is given to each in the engaging direction.

According to the above arrangement, when one tries to rotate the arm 2 in the clockwise direction with a quite large force under the state shown in FIG. 5 or FIG. 6, for example, it is possible to reduce the possibility of releasing the engagement between the ratchet gears 13 and 23 in mesh with each other against the pushing force of the sprig 6. However, if a too large tilting angle is given, it becomes difficult to release the engagement between the ratchet gears 13 and 23 when necessary, and for this reason, the preferable tilting angle is approximately two to three degrees.

The other arrangements and functions of the angle adjusting device of the present embodiment are identical with those of the counterpart of the first embodiment. Thus, like components are labeled with like numerals and the detailed explanation is not repeated for ease of explanation.

Third Embodiment

Figure 9A:
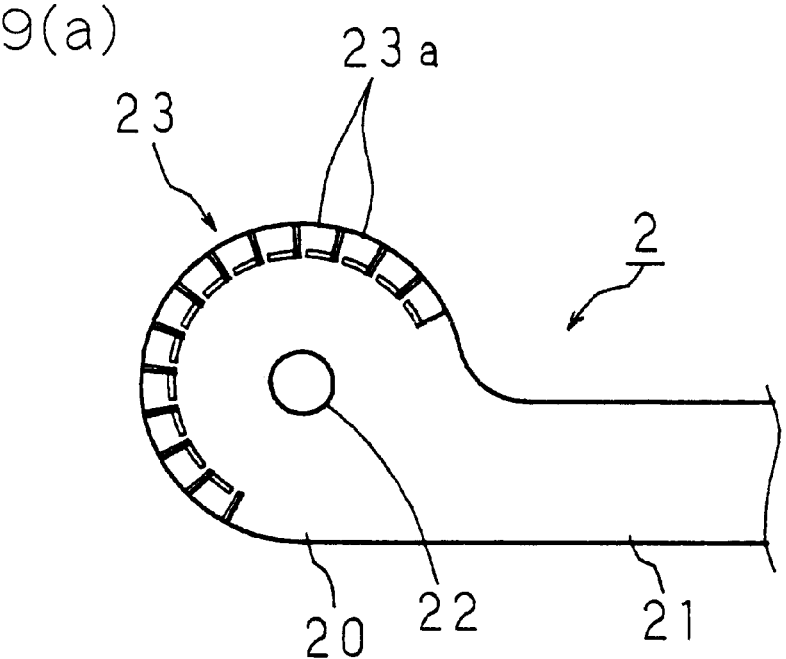
FIG. 9 are views showing a third embodiment of the angle adjusting device according to the present invention.
Figure 9B:
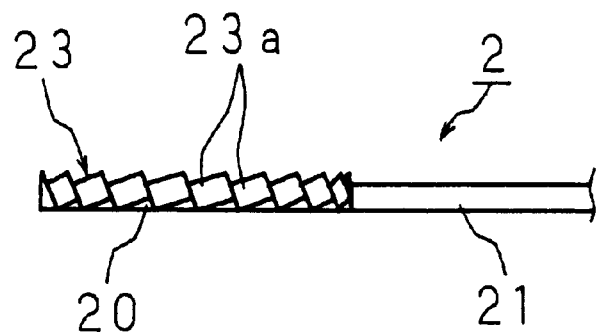
Figure 9C:
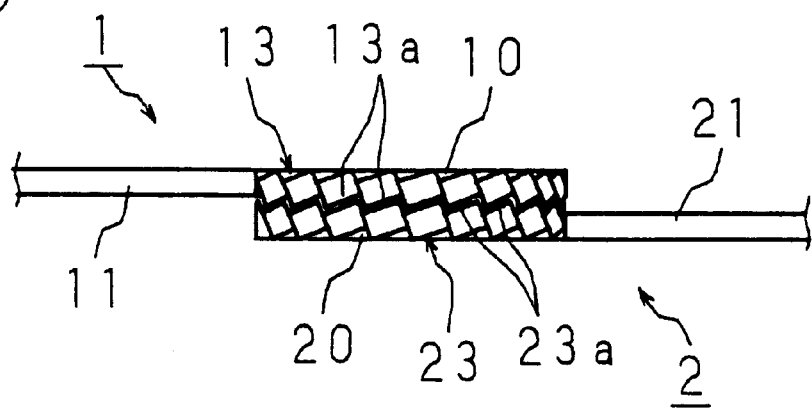

FIG. 9 are views showing a third embodiment of the angle adjusting device according to the present invention. FIG. 9(a) is a plan view of the arm 2 seen from the front, FIG. 9(b) is a top view of the arm 2, and FIG. 9(c) is a top view showing a state when the arms 1 and 2 are joined.

In the present embodiment, the ratchet gears 13 and 23 respectively provided on the arms 1 and 2 are formed in the following manner.

The peripheral portion of each of the rotary portions 10 and 20 is cut in L shapes, and the cut tab-wise portions are pushed outward, so that the tip end portions of the pushed out side form each of the gear teeth 13a and 23a.

Forming each of the gear teeth 13a and 23a in the above manner makes it possible to readily form the ratchet gears 13 and 23 respectively from the arms 1 and 2 each made out of a plate member.

However, as shown in FIG. 9(c), each of the gear teeth 13a and 23a formed in the above manner has a slope tilted in a direction (engaged direction) opposite to the one shown in the second embodiment. Nevertheless, the tilting angle is too small to cause the engagement to be released upon application of a load to some extent as has been discussed above.

The other arrangements and functions of the angle adjusting device of the present embodiment are identical with those of the counterpart of the first embodiment. Thus, like components are labeled with like numerals and the detailed explanation is not repeated for ease of explanation.

Fourth Embodiment

Figure 10A:
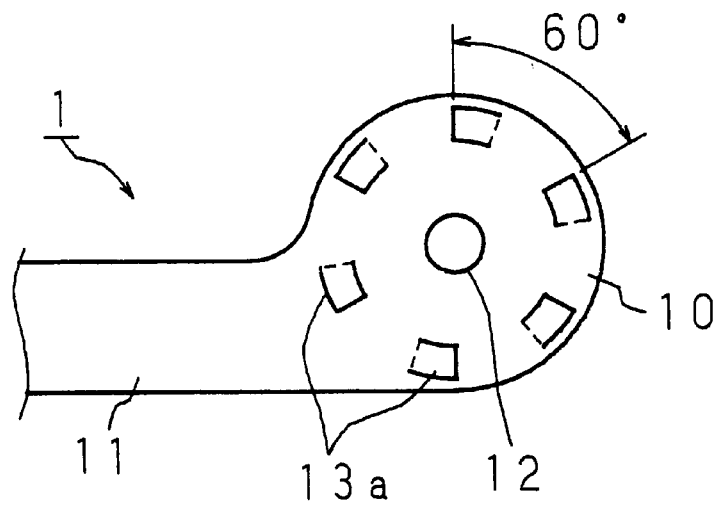
FIG. 10 are views showing a fourth embodiment of the angle adjusting device according to the present invention.
Figure 10B:
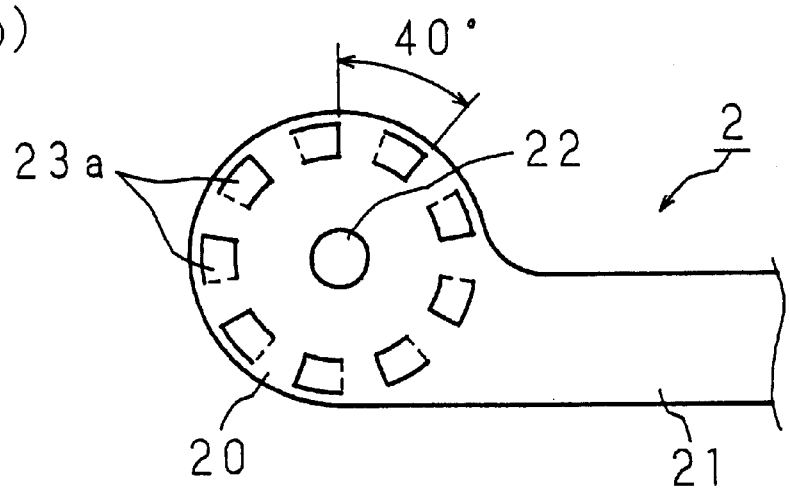
Figure 10C:
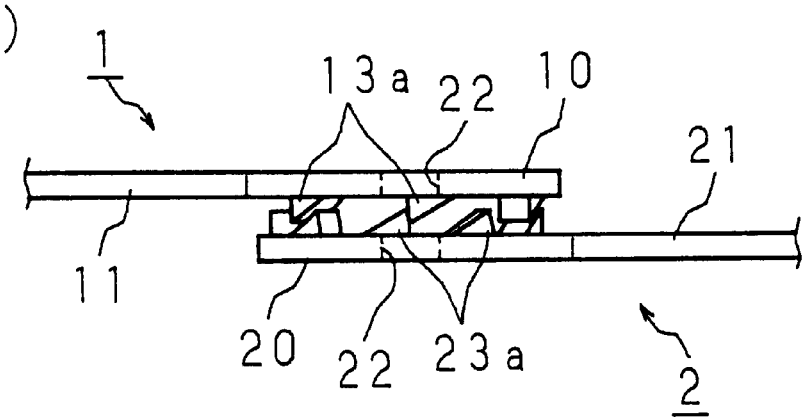

FIG. 10 are views showing a fourth embodiment of the angle adjusting device according to the present invention. FIG. 10(a) is a plan view showing the arm 1 seen from the front, FIG. 10(b) is a plan view showing the arm 2 seen from the front, and FIG. 10(c) is a top view showing a state when the arms 1 and 2 are joined.

In the present embodiment, the gear teeth 13a and 23a respectively provided on the arms 1 and 2 are formed in the following manner.

The peripheral portion of each of the rotary portions 10 and 20 is cut in square cornered C shapes at the slightly inner radial positions, and the cut tab-wise portions are pushed outward, so that the tip end portions of the pushed out side form each of the gear teeth 13a and 23a.

Forming each of the gear teeth 13a and 23a in the above manner makes it possible to readily form the gear teeth 13a and 23a respectively from the arms 1 and 2 each made out of a plate member.

As is in the third embodiment, each of the gear teeth 13a and 23a formed in the above manner has a slope tilted in the engaged direction. However, the tilting angle is too small to cause the engagement to be released upon application of a load to some extent as has been discussed above.

Also, the gear teeth 13a and 23a of the present embodiment are provided at different pitches in the circumferential directions on the arms 1 and 2, respectively. For example, as is shown in FIG. 10(a), six gear teeth 13a are provided on the arm 1 side at an interval of approximately 60°, and as is shown in FIG. 10(b), nine gear teeth 23a are provided on the arm 2 side at an interval of approximately 40°.

By adapting the arrangement discussed above, compared with the arrangements of the first through third embodiments such that allow the angle adjustment in steps as many as the number of the gear teeth 13a and 23a, the angle adjustment is allowed per greatest common divisor of the pitch angles of all the gear teeth 13a and 23a, that is approximately 20° (18 steps).

It should be appreciated, however, that, as is shown in FIG. 10(c), according to the above arrangement, only three of the gear teeth 13a and 23a are in mesh at one time, and not all the gear teeth 13a and 23a mesh with each other simultaneously, which lowers the strength of holding the rotating position of each of the arms 1 and 2. However, a desired holding strength can be secured by increasing the number of the gear teeth 13a and 23a as necessary.

The other arrangements and functions of the angle adjusting device of the present embodiment are identical with those of the counterpart of the first embodiment. Thus, like components are labeled with like numerals and the detailed explanation is not repeated for ease of explanation.

Fifth Embodiment

Figure 11A:
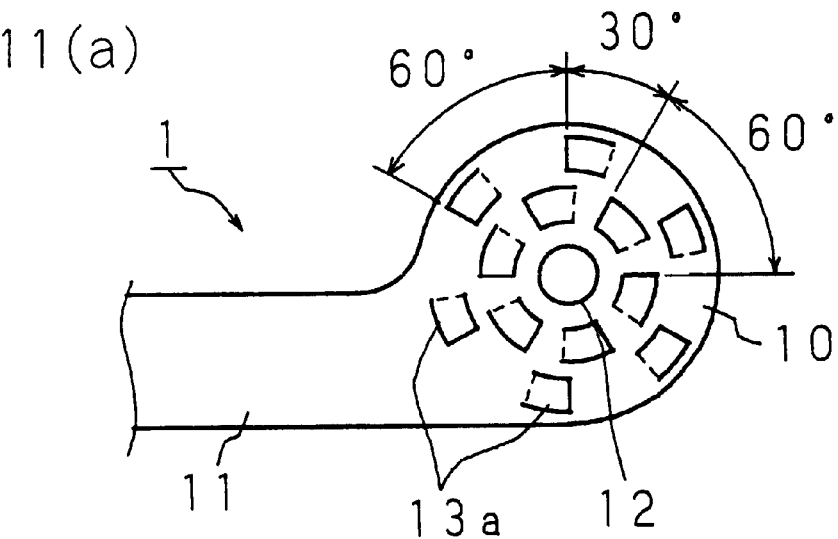
FIG. 11 are views showing a fifth embodiment of the angle adjusting device according to the present invention.
Figure 11B:
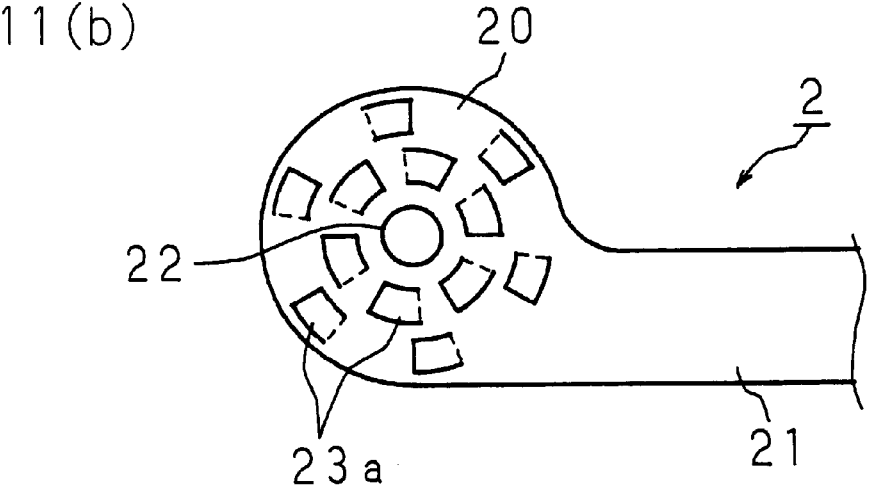

FIG. 11 are views showing a fifth embodiment of the angle adjusting device of the present invention. FIG. 11(a) is a plan view showing the arm 1 seen from the front and FIG. 11(b) is a plan view showing the arm 2 seen from the front.

In the present embodiment, the gear teeth 13a and 23a respectively provided on the arms 1 and 2 are formed in the following manner.

Each of the gear teeth 13a and 23a are formed in the same manner as the fourth embodiment except that a plurality of gear teeth 13a and 23a are formed in two lines in the radius direction of the rotary portions 10 and 20 of the arms 1 and 2, respectively. For example, six gear teeth 13a and six gear teeth 23a are respectively provided on the arms 1 and 2 in the outer lines at an interval of approximately 60°, and six gear teeth 13a and six gear teeth 23a are respectively provided on the arms 1 and 2 in the inner lines at an interval of approximately 60° at positions shifted by approximately 30° with respect to those in the outer line, totaling in 12 gear teeth on each arm.

By adapting the above arrangement, it is possible to form the gear teeth 13a and 23a in a total number exceeding the number attained by physically forming each group of the gear teeth 13a and 23a in a single line. In FIGS. 11, not only can the angle be adjusted by approximately 30° in each time (12 steps), but also all the gear teeth 13a and 23a mesh with each other simultaneously, thereby securing satisfactory strength in holding the rotating position of each of the arms 1 and 2.

The other arrangements and functions of the angle adjusting device of the present embodiment are identical with those of the counterpart of the first embodiment. Thus, like components are labeled with like numerals and the detailed explanation is not repeated for ease of explanation.

Sixth Embodiment

Figure 12A:
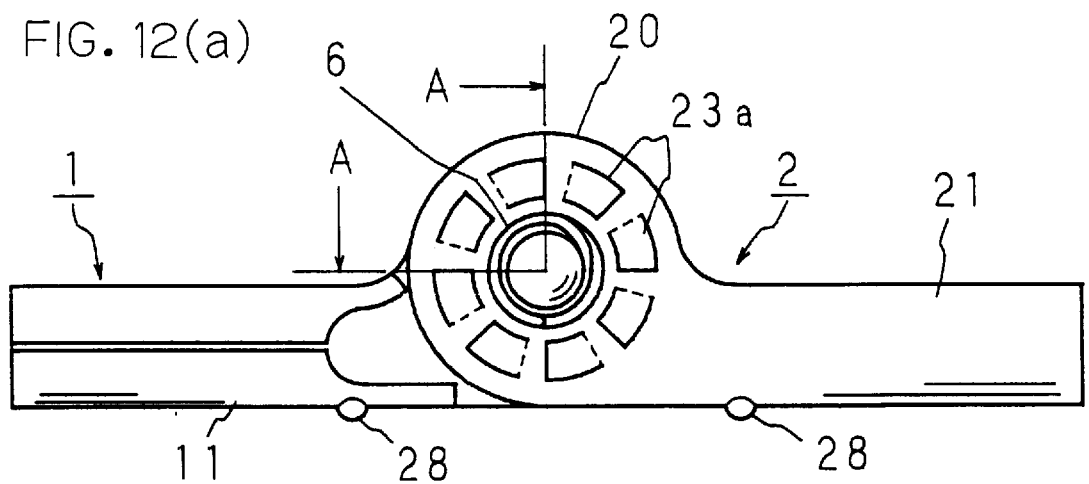
FIG. 12 are views showing a sixth embodiment of the angle adjusting device according to the present invention.
Figure 12B:
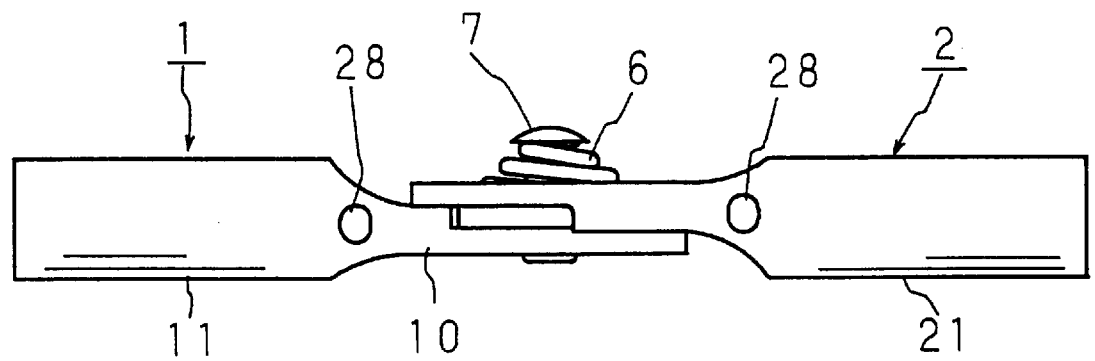
Figure 12C:
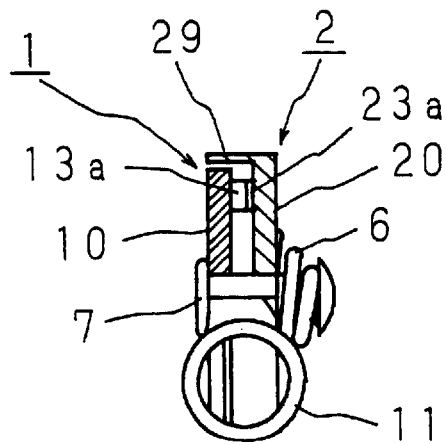

FIG. 12 are views showing a sixth embodiment of the angle adjusting device according to the present invention. FIG. 12(a) is a plan view showing the angle adjusting device seen from the front, and FIG. 12(b) is a bottom view of the angle adjusting device. Also, FIG. 12(c) is a side view of FIG. 12(a) seen from the left side with a portion along the line A—A being removed.

In the present embodiment, the strips of coupling portions 11 and 21 of the arms 1 and 2, respectively, are curved cylindrically by using the longitudinal directions as an axial direction. By forming the coupling portions 11 and 21 in this manner, it is possible to readily couple the pipes of frames of an unillustrated foldable bed to the angle adjusting device by fitting the coupling portions 11 and 21 into the frames.

Two small protrusions 28's are provided to the outer circumferential surfaces at the end portions of the coupling portions 11 and 21 at the sides of the rotary portions 10 and 20, respectively, so that the frames having the coupling portions 11 and 21 fitted therein will not go down too deep toward the rotary portions 10 and 20.

Also, an overhang cover 29 covering the outer circumferential surface of the rotary portion 10 is provided at the peripheral portion of the rotary portion 20. The cover 29 protects the gear teeth 13a and 23a protruding in a space between the rotary portions 10 and 20 from contamination (dust) from the outside. Alternatively, the cover 29 may be provided at the rotary portion 10 side or at both the rotary portions 10 and 20 in double.

Also, the bolt 4 and nut 5 are replaced with a rivet 7. As a result, not only can the dimension of the angle adjusting device in the lengthwise direction be made compact, but also the cost can be saved.

Further, the coil spring employed as the spring 6 is replaced with a spiral spring, and as a result, the dimension of the angle adjusting device in the longitudinal direction can be made more compact. Besides a conical spring made of a wire material as shown in FIGS. 12, a so-called volute spring made out of a plate material can be used as the spiral spring.

The other arrangements and functions of the angle adjusting device of the present embodiment are identical with those of the counterpart of the first embodiment. Thus, like components are labeled with like numerals and the detailed explanation is not repeated for ease of explanation.

Each of the above embodiments showed the arrangement where the arms 1 and 2 are made of metal. However, the angle adjusting device of the present invention can employ arms 1 and 2 made of synthetic resin, because the engagement is established by a plurality of gear teeth 13a and 23a, which makes it possible to achieve a further cost reduction.

INDUSTRIAL APPLICABILITY

As has been discussed above, the angle adjusting device of the present invention is arranged such that a plurality of engaging portions are provided to a pair of rotors that relatively rotate around the axis of rotation on their respective counter surfaces opposing in a direction along the axis of rotation, and a spring for pushing the rotors in an opposing direction is provided to maintain the engagement between the rotors. Consequently, it is possible to readily assemble a rigid and compact angle adjusting device that develops a quite large engaging strength by engaging at the plurality of engaging portions.

Also, it is arranged such that a releasing body is placed concentrically somewhere between the pair of rotors, and the releasing body allows engagement between the pair of rotors when placed at a first rotating position with respect to either one of the pair of rotors, and releases the engagement by moving the pair of rotors apart from each other when placed at a second rotating position. Consequently, it is possible to provide releasing mechanism for the engagement of the angle adjusting device as discussed above by a simple arrangement.

Also, it is arranged such that one of the either one of the rotors and the releasing body is provided with a convex portion on a counter surface opposing the other, and the other is provided with, on a counter surface opposing a counterpart, a concave portion that engages with the convex portion when the releasing body is placed at the first rotating position, the convex portion moving one of the either one of the rotors and the releasing body apart from the other by touching the counter surface of the other except for the concave portion when the releasing body is placed at the second rotating position. Consequently, when the releasing body is at the first rotating position, the convex portion fits into the concave portion and the releasing body is in a state described as, for example, closely adhering to the either one of the rotors, whereby the pair of rotors engage with each other. On the other hand, when the releasing body is at the second rotating position, the convex portion touches the counter surface of the other except for the concave portion, whereby the either one of the rotors and the releasing body that have been in the above closely adhering state are moved apart relatively from each other. Consequently, the either one of the rotors and the other rotor are spaced apart from each other, thereby making it possible to release the engagement as discussed above.

Also, it is arranged such that the releasing body is provided with two contact portions spaced apart by a predetermined distance in a direction of a relative rotation with respect to the other rotor, and the other rotor is provided with a moving portion that moves between the two contact portions in association with a relative rotation with respect to the releasing body, the moving portion allowing the releasing body to rotate to the first and second rotating positions with respect to the either one of the rotors by touching the two contact portions, respectively. Consequently, it is possible to readily achieve rotating mechanism of the releasing body as discussed above.

Also, it is arranged such that the axis of rotation that couples the pair of rotors is composed of a rivet. Consequently, the dimension of the entire angle adjusting device in a direction along the axis of rotation can be made compact.

Also, it is arranged such that the spring is a spiral spring. Consequently, the dimension of the entire angle adjusting device in the direction along the axis of rotation can be made more compact. Here, a conical spring made of a wire material, a volute spring made out of a plate material, etc. can be used as the spiral spring.

Also, it is arranged such that each of the engaging portions is shaped into a triangle including the counter surface of either rotor where each is provided when seen on a cross section in a radius direction of a rotation of the rotor, and either one of side portions of the triangle other than a side on the counter surface of either rotor engages with a corresponding side portion of the engaging portion on the other opposing rotor. Consequently, it is possible to shape each engaging portion into a quite simple triangle tooth.

Also, the either one of side portions is shaped into a serration by giving a tilt of a predetermined angle toward an engaging direction from the opposing direction. Hence, when a force is applied in a direction of a relative rotation of the rotors to maintain their engagement, in order to release the engagement by moving the rotors apart from each other, it is necessary to separate the rotors from each other by forcing each rotor to rotate relatively in a direction against the above force. Consequently, it is possible to maintain the engagement so as not to be released accidentally.

Also, it is arranged such that each of the engaging portions is formed by cutting and bending a part of the rotor. Consequently, it is possible to readily form the engaging portions as an integral part of the rotor commonly formed out of a metal plate.

Also, it is arranged such that the engaging portions are aligned in more than one line at different positions in a diameter direction of the rotor. Consequently, because a larger number of engaging portions can be provided, the adjustment can be carried out step by step with a smaller angle.

Also, it is arranged such that different intervals are given to the engaging portions in a circumferential direction of a rotation between the pair of rotors. Consequently, even when fewer engaging portions are provided, it is possible to carry out the adjustment in every angle set according to the greatest common divisor of isometric angles of the engaging portions on each rotor.

Also, it is arranged such that at least one of the pair of rotors is provided with a coupling portion for coupling to a bar-wise or tube-wise member. Consequently, the coupling portion can be readily coupled to the frames of a legless chair, a foldable bed, for example.

Also, because it is arranged such that the coupling portion is cylindrical, the coupling portion can be coupled to the frames more readily by fitting the former into the latter.

Also, it is arranged such that at least one of the pair of rotors is formed as an integral part of the coupling portion. Consequently, the angle adjusting device can be assembled at a low cost by making these components out of a plate of metal, for example.

Also, because it is arranged such that the rotor and engaging portions are formed out of synthetic resin as one body, the angle adjusting device can be assembled at a lower cost.

Also, it is arranged such that at least one of the pair of rotors is provided with a cover that covers the engaging portions from an outside in a radius direction of a rotation. Consequently, it is possible to prevent unwanted intrusion of dust into the engaging surfaces of the engaging portions or the like from the outside.

Further, it is arranged such that the aforementioned cover and at least one of the pair of rotors are formed as one body. Consequently, it is possible to assemble an angle adjusting device equipped with such a cover at a lower cost. Thus, the present invention can offer the above and other excellent effects.

What is claimed is:

1. An angle adjusting device capable of adjusting a relative rotating position of a pair of rotors coupled through an axis of rotation step by step, comprising:

a pair of rotors;

a plurality of engaging portions provided on opposing surfaces of the pair of rotors opposing in a direction along the axis of rotation;

a spring for pushing the pair of rotors in an opposing direction;

a releasing body placed concentrically between the pair of rotors, wherein the releasing body allows engagement between the pair of rotors when placed at a first rotating position with respect to either one of the pair of rotors, and releases the engagement by moving the pair of rotors apart from each other when placed at a second rotating position wherein:

the releasing body is provided with two contact portions spaced apart in a direction of a relative rotation with respect to the other rotor; and the other rotor is provided with a moving portion that moves between the two contact portions in association with a relative rotation with respect to the releasing body, the moving portion allowing the releasing body to rotate to the first and second rotating positions with respect to the either one of the rotors by touching the two contact portions, respectively.

2. The angle adjusting device according to claim 1, wherein:

one of the either one of the rotors and the releasing body is provided with a convex portion on an opposite surface to the other of the either one of the rotors and the releasing body; and the other is provided with, on an opposite surface to the one of the either one of the rotors and the releasing body, a recess that engages with the convex portion when the releasing body is placed at the first rotating position, the convex portion moving the one of the either one of the rotors and the releasing body apart from the other by touching the opposite surface of the other except for the recess when the releasing body is placed at the second rotating position.

3. The angle adjusting device according to claim 1, wherein the axis of rotation is composed of a rivet.

4. The angle adjusting device according to claim 1, wherein the spring is a spiral spring.

5. The angle adjusting device according to claim 1, wherein:

each of the engaging portions is shaped into a triangle including the opposing surface of either rotor where each is provided when seen on a cross section in a radius direction of a rotation of the rotor; and either one of side portions of the triangle other than a side on the opposing surface of either rotor engages with a corresponding side portion of the engaging portion on the other rotor.

6. The angle adjusting device according to claim 5, wherein the either one of side portions is tilted by a predetermined angle toward an engaging direction from the opposing direction.

7. The angle adjusting device according to claim 1, wherein each of the engaging portions is formed by cutting and bending a part of either rotor where each is provided.

8. The angle adjusting device according to claim 1, wherein the plurality of engaging portions are aligned in more than one line at radially different positions of each rotor where the plurality of engaging portions are provided.

9. The angle adjusting device according to claim 1, wherein different intervals are given to the plurality of engaging portions in a direction of a rotation between the pair of rotors.

10. The angle adjusting device according to claim 1, wherein at least one of the pair of rotors is provided with a coupling portion for coupling to a bar or tube member.

11. The angle adjusting device according to claim 10, wherein the coupling portion is cylindrical.

12. The angle adjusting device according to claim 10, wherein at least one of the pair of rotors is formed as an integral part of the coupling portion.

13. The angle adjusting device according to claim 1, wherein at least one of the pair of rotors is provided with a cover that covers, at least partially, the plurality of engaging portions from an outside in a radius direction of a rotation.

14. The angle adjusting device according to claim 13, wherein at least one of the pair of rotors and the cover are formed as one body.

15. The angle adjusting device according to claim 1, wherein at least one of the pair of rotors is provided with a cover that entirely covers the plurality of engaging portions from an outside in a radius direction of a rotation.

16. The angle adjusting device according to claim 15, wherein at least one of the pair of rotors and the cover are formed as one body.

17. An angle adjusting device capable of adjusting a relative rotating position of a pair of rotors coupled through an axis of rotation step by step, comprising:

a pair of rotors;

a plurality of engaging portions provided on opposing surfaces of the pair of rotors opposing in a direction along the axis of rotation; and a spring for pushing the pair of rotors in an opposing direction, wherein at least one of the pair of rotors and the plurality of engaging portions are formed out of synthetic resin as one body.

* * * * *